United States Patent Office 3,147,271
Patented Sept. 1, 1964

3,147,271
N¹-PYRIDYLALKYL-N⁵-SUBSTITUTED BIGUANIDES
Seymour L. Shapiro, Hastings on Hudson, and Louis Freedman, Bronxville, N.Y., assignors to U.S. Vitamin & Pharmaceutical Corporation, New York, N.Y., a corporation of Delaware
No Drawing. Filed Nov. 30, 1960, Ser. No. 72,551
6 Claims. (Cl. 260—296)

This invention is concerned with novel N¹-substituted pyridylalkyl biguanides of the structure shown:

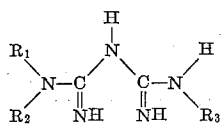

wherein $R_1$ is selected from the group consisting of picolyl and pyridylethyl, and $R_2$ is selected from the group consisting of hydrogen and methyl, and $R_3$ is selected from the group consisting of alkyl, aralkyl, phenyl and substituted phenyl, and particularly, halophenyl.

The compounds of this invention are strong bases and are obtainable as mono- and di-acid salts with the non-toxic mineral acids such as hydrochloric, hydrobromic, nitric, sulfuric, and phosphoric acid.

The compounds of this invention are conveniently prepared by reaction of the appropriate $R_3$-substituted amine hydrochloride with the novel pyridylalkyl dicyandiamides described in our copending application.

In the instance where $R_3$ is an aryl group, the compounds are prepared by refluxing in water [Shapiro, et al. J.A.C.S. 81: 3725 (1959)]. When the $R_3NH_2$ group is alkyl or aralkyl, the amine as the hydrochloride is fused with the appropriately substituted $R_1R_2$ dicyandiamide over a 0.5–2 hour interval as the external temperature is gradually raised within the range of 100–200°.

The process of compounds of this invention will be more clearly understood from a consideration of the following examples which are given for the purposes of illustration only and are not to be considered as limiting the scope of the invention in any way.

EXAMPLE 1

General procedure for the preparation of the pyridylalkyl dicyandiamides: A solution of 0.5 mole of the appropriate picolyl or pyridylethylamine in 500 ml. of n-butanol was treated under cooling and stirring with 42 ml. of 12 N hydrochloric acid, followed by the addition of 55.0 g. (0.5 mole) of sodium dicyanamide. The white suspension was heated under reflux for 6 hours with stirring. The hot solution was filtered to separate the formed sodium chloride and after removal of the butanol, the residue of the product was recrystallized. Typical of the syntheses, reflecting this invention, are the compounds listed in Table I.

Table I

PICOLYL AND PYRIDYLETHYL DICYANDIAMIDES

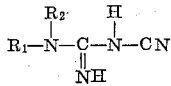

| No. | $R_1$ | $R_2$ | M.P., °C. | Yield,a percent | Formula | Analysis, percent | | | | | |
|---|---|---|---|---|---|---|---|---|---|---|---|
| | | | | | | Carbon | | Hydrogen | | Nitrogen | |
| | | | | | | Calcd. | Found | Calcd. | Found | Calcd. | Found |
| 1 | 2-picolyl | H | 142–145 | b 48 | $C_8H_9N_5$ | 54.8 | 54.1 | 5.2 | 5.1 | 40.0 | 40.7 |
| 2 | 3-picolyl | H | 147–150 | 57 | $C_8H_9N_5$ | 54.8 | 54.6 | 5.2 | 5.4 | 40.0 | 39.8 |
| 3 | 4-picolyl | H | 78–81 | b 31 | $C_8H_{11}N_5O$ c | 49.7 | 49.9 | 5.7 | 5.7 | 36.3 | 35.7 |
| 4 | 2-picolyl | $CH_3$ | 150–152 | 39 | $C_9H_{11}N_5$ | 57.1 | 57.1 | 5.9 | 5.7 | 37.0 | 37.1 |
| 5 | 3-picolyl | $CH_3$ | 158–160 | 54 | $C_9H_{11}N_5$ | 57.1 | 57.2 | 5.9 | 6.0 | 37.0 | 37.1 |
| 6 | 2-pyridylethyl | H | 143–146 | 67 | $C_9H_{11}N_5$ | 57.1 | 57.2 | 5.9 | 6.0 | 37.0 | 37.3 |
| 7 | 4-pyridylethyl | H | 194–195 | 36 | $C_9H_{11}N_5$ | 57.1 | 57.2 | 5.9 | 6.0 | 37.0 | 37.3 |
| 8 | 2-pyridylethyl | $CH_3$ | 165–168 | b 66 | $C_{10}H_{13}N_5$ | 59.1 | 58.9 | 6.5 | 6.7 | | |
| 9 | 4-pyridylethyl | $CH_3$ | 202–204 | b 39 | $C_{10}H_{13}N_5$ | 59.1 | 58.8 | 6.5 | 6.3 | | | a Recrystallizing solvent is isopropyl alcohol-hexane unless otherwise shown.
b Recrystallizing solvent is acetonitrile.
c Isolated, and analyses shown as monohydrate.

EXAMPLE 2

N¹-methyl - N¹ - (4 - pyridylethyl) - N⁵ - (p - chlorophenyl)-biguanide hydrochloride: A solution of 1.9 g. (0.015 mole) of p-chloroaniline in 4.9 ml. (0.03 mole) of 6 N hydrochloric acid was treated wtih 3.0 g. of N-methyl-(4-pyridylethyl)-dicyandiamide and the reaction mixture heated under reflux for 5 hours. When cool, the product precipitated as a glassy solid and was separated, and after solution in hot water, on cooling, gave 2.7 g. of product, M.P. 212–213°.

The compound was further identified as its dipicrate, M.P. 209–211° (water).

Analysis.—Calcd. for $C_{26}H_{21}ClN_{12}O_{14}$: C, 41.0; H, 2.8; N, 21.3. Found: C, 43.1; H, 3.5; N, 21.3.

EXAMPLE 3

N¹ - (2-picolyl) - N⁵ - (p - chlorophenyl) - biguanide hydrochloride: In a manner similar to that described for Example 2, substituting (2-picolyl)-dicyandiamide, the product was obtained (2.1 g.), M.P. 183–185°.

The product was further identified as its dipicrate, M.P. 200–202° (water).

*Analysis.*—Calcd. for $C_{26}H_{21}ClN_{12}O_{14}$: C, 41.0; H, 2.8; N, 22.1. Found: C, 41.4; H, 2.6; N, 22.3.

EXAMPLE 4

$N^1$ - methyl - $N^1$ - (2 - picolyl) - $N^5$ - (p - chlorophenyl)-biguanide hydrochloride: In a manner similar to that described for Example 2, and substituting N-methyl-(2-picolyl)-dicyandiamide, there was obtained the product (2.5 g.), M.P. 223–224°.

The compound was further identified as its dipicrate, M.P. 194–196° (water).

*Analysis.*—Calcd. for $C_{27}H_{23}ClN_{12}O_{14}$: C, 41.8; H, 3.0; N, 21.7. Found: C, 41.9; H, 2.8; N, 21.1.

EXAMPLE 5

$N^1$ - methyl - $N^1$ - (2 - pyridylethyl) - $N^5$ - (p-chlorophenyl)-biguanide hydrochloride: In a manner similar to that described for Example 2, and substituting N-methyl-(2-pyridylethyl)-dicyandiamide, there was obtained the product (1.7 g.), M.P. 204–205°.

The product was further identified as its dipicrate, M.P. 211–212° (water).

*Analysis.*—Calcd. for $C_{28}H_{25}ClN_{12}O_{14}$: C, 42.6; H, 3.2. Found: C, 43.3; H, 3.1.

EXAMPLE 6

$N^1$ - methyl - $N^1$ - (3-picolyl) - $N^5$ - (p-chlorophenyl)-biguanide hydrochloride: In a manner similar to that described for Example 2, substituting N-methyl-(3-picolyl)-dicyandiamide, there was obtained the product (3.25 g.), M.P. 227–228°.

It was further identified as its dipicrate, M.P. 207–210° (water).

*Analysis.*—Calcd. for $C_{27}H_{23}ClN_{12}O_{14}$: C, 41.8; H, 3.0; N, 21.7. Found: C, 42.1; H, 3.2; N, 22.2.

EXAMPLE 7

$N^1$ - (2 - pyridylethyl) - $N^5$ - (p - chlorophenyl) - biguanide hydrochloride: In a manner similar to that described for Example 2, there was obtained a product (3.6 g.) M.P. 214–216°.

It was further identified as its dipicrate, M.P. 182–184° (ethanol-hexane).

*Analysis.*—Calcd. for $C_{27}H_{23}ClN_{12}O_{14}$: C, 41.8; H, 3.0. Found: C, 41.3; H, 3.0.

In a similar manner, variation of the aromatic amine as aniline, p-bromoaniline, 2,4-dichloroaniline, 3,4-dichloroaniline, 3,5-dichloroaniline, p-iodoaniline, 4-chloro-o-toluidine, on condensation with the dicyandiamides described in Table I, affords the corresponding $R_3$-aryl substituted $N^1$-picolyl and $N^1$-pyridylethyl biguanides.

EXAMPLE 8

$N^1$ - methyl - $N^1$ - (4 - pyridylethyl) - $N^5$ - (β-phenethyl)-biguanide hydrochloride: An intimately ground mixture of 2.36 g. (0.015 mole) of β-phenethyl amine hydrochloride and 3.0 g. (0.015 mole) of N-methyl-(4-pyridylethyl)-dicyandiamide were heated over 1 hour as the internal temperature was raised from 130° to 157°. When cool, the formed product was granulated under ether, filtered, and recrystallized from isopropyl alcohol-hexane to give 1.33 g. of product, M.P. 208–210°.

*Analysis.*—Calcd. for $C_{18}H_{25}ClN_6$: C, 59.9; H, 7.0. Found: C, 59.6; H, 6.4.

In a similar manner, substituting the alkyl or aralkyl amine hydrochloride as for example: methylamine, propylamine, isobutylamine, amylamine, benzylamine, p-chlorobenzylamine, 2,4-dichlorobenzylamine, 3,4-dichlorobenzylamine, furfurylamine, phenylpropylamine, on condensation with the dicyandiamides described in Table I, under the fusion procedure above, gives the appropriately $R_3$-substituted $N^1$-picolyl and pyridylethyl biguanides.

The compounds of this invention show potent anti-inflammatory properties and, in addition, have a marked capacity to induce the lysis of selected strains of *B. subtilis.*

The capacity to induce such lysis and, in particular, the noted ability of the compounds of this application to afford such lysis at relatively low concentrations (approximately 20 parts per million) is projectable to the application of these compounds for radiation-protective use. [Weinberg, et al. Experimental Cell Research 15:625 (1958).]

The compounds of this invention, being biguanides, are also important intermediates for the preparation of triazines by reaction with esters.

It is to be understood that it is intended to cover all changes and modifications of the examples herein chosen for the purposes of illustration which do not constitute departure from the spirit and scope of the invention.

We claim:

1. The compound selected from the group consisting of the compounds of the formula

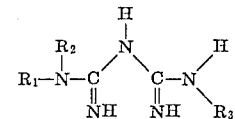

and their non-toxic mineral acid salts; wherein $R_1$ is selected from the group consisting of picolyl and pyridylethyl, $R_2$ is selected from the group consisting of hydrogen and methyl, and $R_3$ is selected from the group consisting of lower alkyl, phenyl, halophenyl, phenyl-lower alkyl, and halophenyl-lower alkyl.

2. The compound

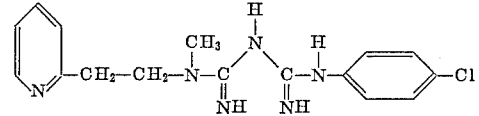

3. The compound

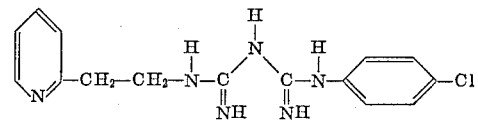

4. The compound

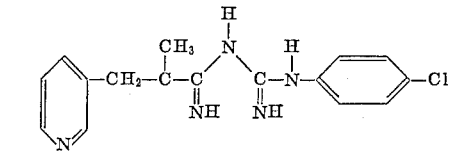

5. The compound

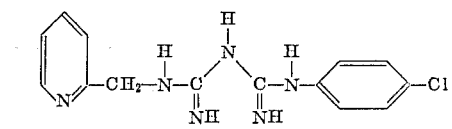

6. The compound

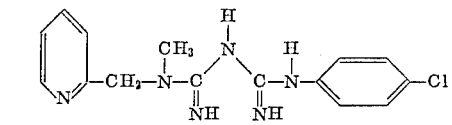

References Cited in the file of this patent

UNITED STATES PATENTS

| | | |
|---|---|---|
| 2,455,896 | Nagy | Dec. 7, 1948 |
| 3,036,083 | Mull | May 22, 1962 |

OTHER REFERENCES

Roy et al.: Chem. Abstracts, vol. 45, col. 6636 (1951).